United States Patent [19]
Horibe et al.

[11] Patent Number: 6,101,532
[45] Date of Patent: Aug. 8, 2000

[54] ELECTRONIC CONFERENCE SYSTEM

[75] Inventors: Takashi Horibe; Tetsuji Ohno; Noriyuki Takahashi; Takahiro Tanida, all of Yokohama, Japan

[73] Assignee: Hitachi, Ltd., Tokyo, Japan

[21] Appl. No.: 09/106,353

[22] Filed: Jun. 29, 1998

[30] Foreign Application Priority Data

Jun. 27, 1997 [JP] Japan ..................................... 9-171663

[51] Int. Cl.⁷ ...................................................... G06F 15/16
[52] U.S. Cl. ............................ 709/206; 709/207; 709/204
[58] Field of Search ..................................... 709/204, 205, 709/206, 207, 106; 707/500, 514, 516, 522, 534, 540, 204, 200, 101; 345/330; 370/260; 379/202, 205, 93.01, 93.74

[56] References Cited

U.S. PATENT DOCUMENTS

| 5,799,151 | 8/1998 | Hoffer ....................................... 709/204 |
| 5,917,489 | 6/1999 | Thurlow et al. ......................... 345/347 |
| 5,978,820 | 11/1999 | Mase et al. .............................. 707/531 |
| 6,029,195 | 2/2000 | Herz ........................................ 709/219 |

*Primary Examiner*—Mehmet B. Geckil
*Attorney, Agent, or Firm*—Antonelli, Terry, Stout & Kraus, LLP

[57] ABSTRACT

Only important portions in all of messages are extracted in the halfway or after the end of a discussion and are allowed to be referred to the user. The time for discussion is reduced, thereby smoothly proceeding a conference. An electronic conference system is constructed in an electronic conference system server in a manner such that a plurality of user clients are connected to the electronic conference system server through a network (not shown). The electronic conference system is made up of a message database, a message relation extracting unit, a message type setting unit, a message input and display unit, and an electronic conference summarizing system. The electronic conference summarizing system is constructed by a discussion path specifying unit, a message merging unit, a duplication message deleting unit, and a message summary file. All of the conclusions derived from a subject and its discussion tree are extracted, unnecessary portions such as quotations or the like are deleted, and the correspondence of questions and answers is arranged and is formed as a summary.

19 Claims, 9 Drawing Sheets

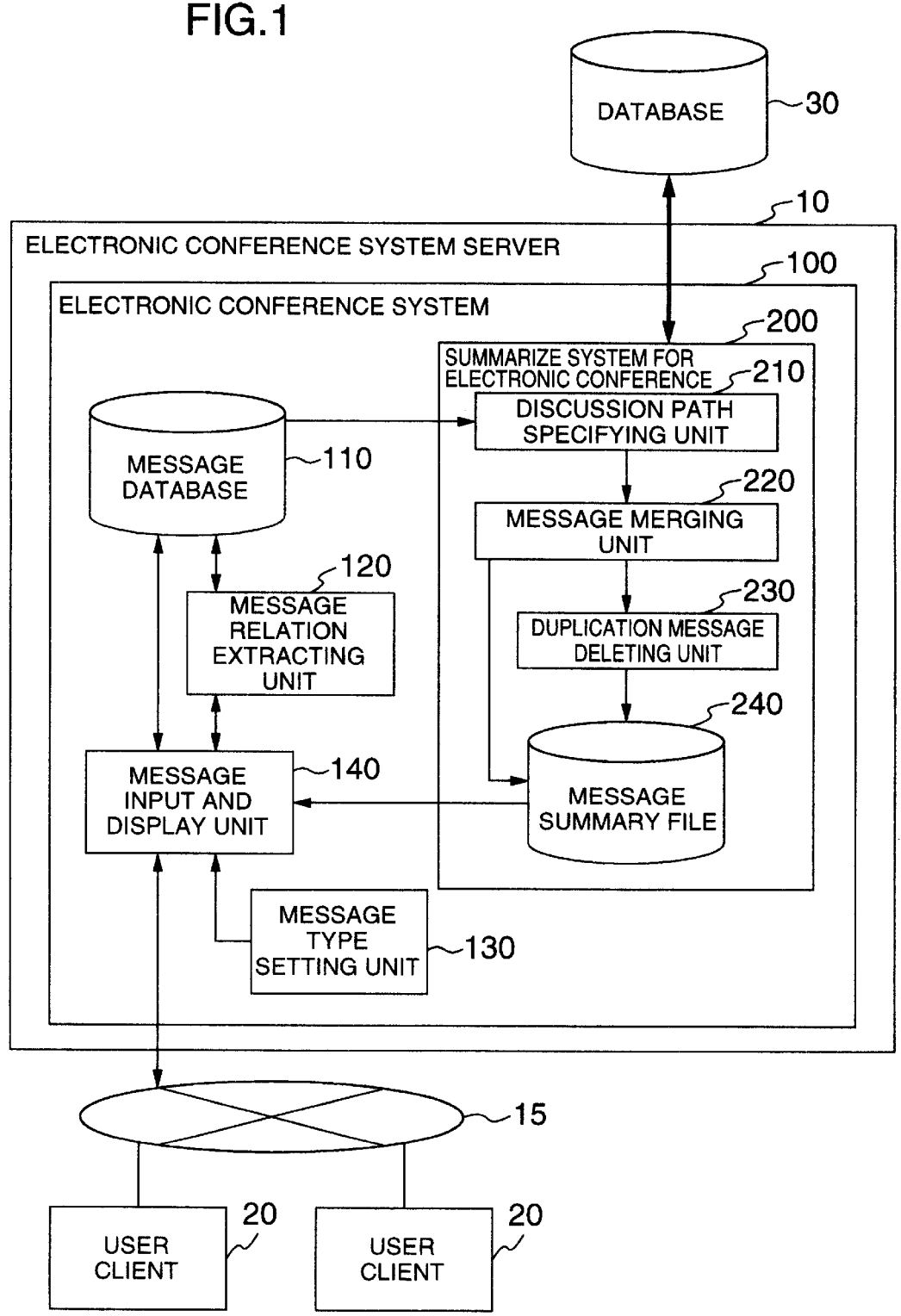

FIG.2

201 — MESSAGE No. : 0001
202 — TITLE : WITH RESPECT TO A CHANGE IN ASSOCIATION WITH A ○○ FUNCTION SUPPORT
203 — WRITTEN BY : ICHIRO TAKAHASHI
204 — MESSAGE TYPE : ○ OPINION ● QUESTION ○ ANSWER ○ REQUEST ○ REPORT ○ CONCLUSION
205 — TEXT :
206 — IMPORTANCE : TO REALIZE A ○○ FUNCTION, THE FOLLOWING CHANGES ARE CONSIDERED AS FOR THE □□ COMPONENT.
PLEASE REVISE AN INFLUENCE ON THE RELATED PRODUCTS AND TEACH ME A RESULT.
207 — SUPPLEMENTARY : I WILL REEXAMINE IF THE INFLUENCE RANGE IS LARGE.
208 — RELATION : (NOT-INPUTTED)

CANCEL — 209
REGISTER — 211

FIG.3A

MESSAGE DATA

| MESSAGE No. |
| WRITTEN BY |
| MESSAGE TYPE |
| TITLE |
| TEXT |

FIG.3B

| NODE ELEMENTS OF MESSAGE RELATION LIST | |
|---|---|
| 1ST | MESSAGE No. |
| 2ND | PARENT MESSAGE No. |
| 3RD | POINTER TO THE REPLY MESSAGE LIST FOR THE PRESENT MESSAGE |
| 4TH | POINTER TO THE NEXT REPLY MESSAGE FOR THE PARENT MESSAGE |

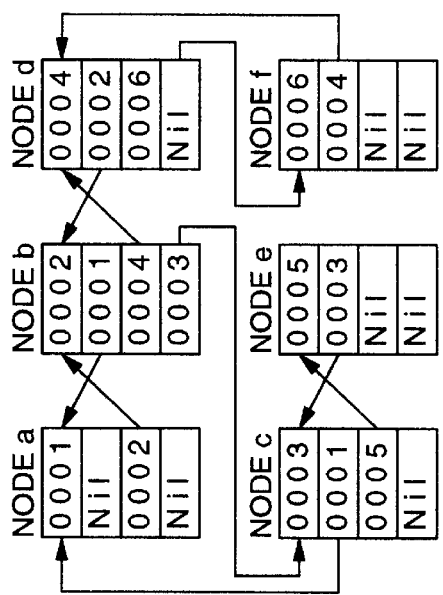

| MESSAGE No. | WRITTEN BY | MESSAGE TYPE | TITLE | TEXT |
|---|---|---|---|---|
| 0001 | TAKAHASHI | QUESTION | WITH RESPECT TO A CHANGE IN ASSOCIATION WITH THE ○○ FUNCTION SUPPORT | .... |
| 0002 | ITO | ANSWER | Re: ... A CHANGE IN ASSOCIATION WITH THE ○○ FUNCTION SUPPORT | .... |
| 0003 | TANAKA | REQUEST | Re: ... A CHANGE IN ASSOCIATION WITH THE ○○ FUNCTION SUPPORT | .... |
| 0004 | SATO | ANSWER | Re:Re: ... IN ASSOCIATION WITH THE ○○ FUNCTION SUPPORT | .... |
| 0005 | ITO | ANSWER | Re:Re: ... IN ASSOCIATION WITH THE ○○ FUNCTION SUPPORT | .... |
| 0006 | TAKAHASHI | CONCLUSION | Re:Re:Re: ... WITH THE ○○ FUNCTION SUPPORT | .... |

FIG.4

- 0002 ITO [ANSWER] Re : ⋯CHANGE IN ASSOCIATION WITH THE ○○ FUNCTION SUPPORT
  - 0004 SATO [ANSWER] Re:Re:⋯ THE ○○ FUNCTION SUPPORT
    - 0006 TAKAHASHI [CONCLUSION] Re:Re:Re: ⋯ ○○ FUNCTION SUPPORT
- 0003 TANAKA [REQUEST] Re: ⋯ IN ASSOCIATION WITH THE ○○ FUNCTION SUPPORT
  - 0005 ITO [ANSWER] Re:Re: ⋯ IN ASSOCIATION WITH THE ○○ FUNCTION SUPPORT

TEXT :

[IMPORTANCE]
　　TO REALIZE A ○○ FUNCTION,THE FOLLOWING CHANGES ARE CONSIDERED AS FOR THE □□ COMPONENT.PLEASE REVISE AN INFLUENCE ON THE RELATED PRODUCTS AND TEACH ME A RESULT.
[SUPPLEMENTARY]
　　I WILL REEXAMINE IF THE INFLUENCE RANGE IS LARGE.
[RELATION]

REPLY

FIG.5

MESSAGE No. : 0002

TITLE : Re:WITH RESPECT TO A CHANGE IN ASSOCIATION WITH A ○○ FUNCTION SUPPORT

WRITTEN BY : JIRO ITO

MESSAGE TYPE : ○ OPINION  ○ QUESTION  ● ANSWER  ○ REQUEST  ○ REPORT  ○ CONCLUSION

TEXT :

IMPORTANCE :
>TO REALIZE A ○○ FUNCTION,THE FOLLOWING
>CHANGES ARE CONSIDERED AS FOR THE □□
>COMPONENT.
>PLEASE REVISE AN INFLUENCE ON THE RELATED
>PRODUCTS AND TEACH ME A RESULT.

SUPPLEMENTARY :
>I WILL REEXAMINE IF THE INFLUENCE RANGE
>IS LARGE.

RELATION : (NOT-INPUTTED)

[CANCEL] [REGISTER]

FIG.6

```
MESSAGE No. : 0004
TITLE :        Re:Re:WITH RESPECT TO A CHANGE IN
               ASSOCIATION WITH A ○○ FUNCTION SUPPORT
WRITTEN BY :   SABURO SATO
MESSAGE        ○ OPIN-    ○ QUES-    ● AN-      ○ RE-      ○ RE-      ○ CON-
TYPE :           ION        TION       SWER       QUEST      PORT       CLUSION
TEXT :
IMPOR-         >>TO REALIZE A ○○ FUNCTION,THE FOLLOWING
TANCE :        >>CHANGES ARE CONSIDERED AS FOR THE □□
               >>COMPONENT.
               >>PLEASE REVISE AN INFLUENCE ON THE RELATED
               >>PRODUCTS AND TEACH ME A RESULT.
               >IT SEEMS TO ME THAT THERE IS NO PROBLEM
               IF ×× OF □□ IS CHANGED IN THE PRESENT
               COMPONENT,A LARGE CORRECTION OCCURS IN △△.
               PLEASE CONSIDER ANOTHER SYSTEM.

SUPPLE-        >>I WILL REEXAMINE IF THE INFLUENCE RANGE
MENTARY :      >>IS LARGE.

RELATION :     (NOT-INPUTTED)

CANCEL    REGISTER
```

FIG.9

TITLE: WITH RESPECT TO A CHANGE IN ASSOCIATION WITH A ○○ FUNCTION SUPPORT

[SUBJECT]

WRITTEN BY : ICHIRO TAKAHASHI

TO REALIZE A ○○ FUNCTION,THE FOLLOWING CHANGES ARE CONSIDERED AS FOR THE □□ UNIT. PLEASE REVISE AN INFLUENCE ON THE RELATED PRODUCTS AND TEACH ME A RESULT.

[CONCLUSION]

WRITTEN BY : ICHIRO TAKAHASHI

>IF ×× OF □□ IS CHANGED IN THE PRESENT
>COMPONENT,A LARGE CORRECTION OCCURS IN △△.
>PLEASE CONSIDER ANOTHER SYSTEM.
IT IS DETERMINED THAT THE SUPPORT OF THE ○○ FUNCTION IS CANCELED THIS TIME BECAUSE OF THE ABOVE REASONS.

DETAILS   CLOSE

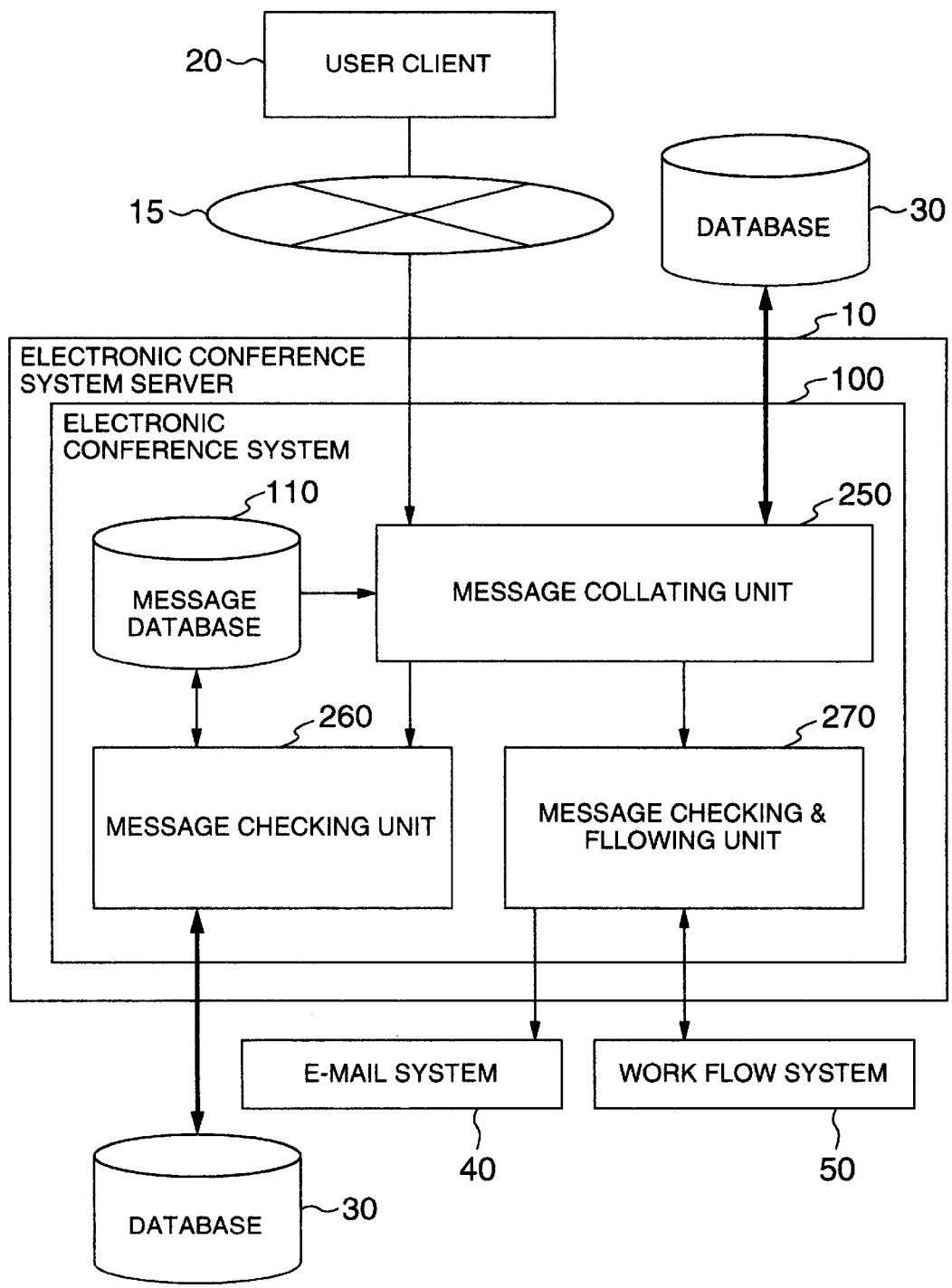

ELECTRONIC CONFERENCE SYSTEM

BACKGROUND OF THE INVENTION

1. Field of the Invention

The invention relates to an electronic conference system using a network and a database and, more particularly, to an electronic conference system in which a person who participates in a conference halfway can grasp the proceeding of the conference in a short time. The invention also relates to an electronic conference system in which after the end of a conference, the participants of the conference can immediately get a summary of the conference.

2. Description of the Prior Art

Hitherto, an electronic conference system using a number of terminal devices connected to a network has been known. As such an electronic conference system, there is a case where it is provided as one function of a telecomputing or personal computer communication such that the user communicates with a host computer by a personal computer at home or in a company via a telephone line or a dedicated line or the user receives information services from a provider. In the telecomputing or personal computer communication, there is a mechanism called a forum or SIG [special interest group] as a place where opinions or information about a common subject is exchanged. A library is provided for such a mechanism and messages posted in the electronic conference, programs, and data are recorded. A message, an opinion, a criticism, a supplement, an annotation, or the like which is added by another person to information written in an electronic conference room or on an electronic notice board is called a [comment]. A behavior to add a comment or an answer to the original message is called a [follow]. What is obtained by connecting only the follow to the original messages is called a comment tree or thread. What is obtained by making a list of only threads for a certain message can be handled as proceedings of its discussion.

In the electronic conference system by those conventional techniques, as the number of messages of the user of the system increases, the relation between the messages becomes complicated. Since a reply message which responded to a certain message is posted by citing the messages which were posted before, a sentence of the same contents appears by a plurality of messages. The user who uses the electronic conference system is hard to understand a corresponding relation of the message contents.

In the case where the user who uses the electronic conference system in the conventional technique newly participates in an electronic conference in which the discussion has been proceeded to a certain extent, it is necessary to see all of the messages which have already been posted.

Generally, when it is necessary to read a large quantity of document, a system for summarizing sentences and extracting important portions is demanded for the user and many studies regarding the techniques to summarize sentences have been performed so far.

However, a system which can summarize a document having a hierarchical structure and including quotations like an electronic conference is not known. As a conventional technique regarding a system for summarizing a single sentence, a technique disclosed in JP-A-4-74259 "Document summarizing apparatus" is known. The above technique discloses a technique for morpheme analyzing a sentence as a target to form a summary every sentence and discriminating an important sentence on the basis of character decoration information added to the characters, for example, information such as underline, mesh, emphasis, or the like added to the characters. Even if such a conventional technique is tried to be applied to an electronic conference system to which the invention is applied, when character decoration information is not added, a discussion is not summarized.

In the electronic conference system to which the invention is applied, what is called, an electronic conference system such that the number of messages increases as the discussion proceeds and, in association with it, a degree of complexity of the structure of the discussion tree increases such that a path of the discussion is branched or the like, a technique to effectively form a summary of the discussion is not known. Therefore, in the conventional technique, when it is desired to know the summary of the discussion in the halfway or after the end of the discussion, it is necessary to read all of the messages. There are, consequently, a problem such that it takes time to understand the contents of the discussion and it is difficult to efficiently grasp the contents.

SUMMARY OF THE INVENTION

It is an object of the invention to solve the problem of the foregoing conventional technique and to provide an electronic conference system such that with respect to a discussion serving as a core of the discussion, a portion in which the contents are duplicated due to a quotation or the like is eliminated, exchanges of the discussion are made correspond, and the making or reference of a sentence to efficiently read the contents of the discussion can be supported.

According to the invention, the above object is accomplished by an electronic conference system in which a plurality of users can post messages through a plurality of clients connected via a network and the user can refer to the posted messages, comprising: message type setting means for previously defining a plurality of kinds of message types to classify the message contents, for giving the defined message types as selection items when the user inputs messages, and for allowing the user to select one of them, thereby setting the message type every message which is inputted; message input and display means for inputting and holding a proposed message which newly poses a subject from all of the messages and a reply message serving as an opinion or an answer for the other messages which have already been posted so as to distinguish them, for holding information for related subject between the reply message and the reply target message which is used as a target of the opinion or answer by the reply message, for citing the contents of the reply target message onto an input screen when the reply message is inputted and adding a mark to the quotation block, and for visually displaying the reply relation of all of the messages on a database so as to enable the contents of the reply target message and the reply message to be referred in an arbitrary direction on the basis of the information for related subject; discussion path specifying means for discriminating a conclusion message in which the message type has been set as a conclusion of a discussion and for tracing from the conclusion message in the direction of the proposed message with reference to the reply relation between the messages extracted by the information for related subject with the held reply messages, thereby deriving a path to specify a flow of the discussion; message merging means for comparing the contents of the quotation portion shown by the mark with the portion of a sentence of the reply target message of the relevant message when tracing from the conclusion message of a certain discussion toward the proposed message and for merging a plurality of messages by inserting to the relevant position of the reply target message in a state as it is or in a state where the quotation portion is omitted; and duplication message deleting means for specifying the duplicated portions by examining the mark which is added upon quotation and the contents of the sentence in the case where in the outputted merging result, the portion cited from the reply target message and the same portion of the reply target message duplicate and appear in the reply message and for leaving at least one of the duplicated portions and deleting the other portions, thereby summarizing the discussion.

The above object is accomplished by further comprising: means for constructing a knowledge base by posting the discussion summarized by the duplication message deleting means into the database; and means for extracting similar items from the database on the basis of the message inputted from the user and presenting.

The above object is accomplished by further comprising: means for accumulating attributes of the writer as a database; means for automatically allocating the attributes to the message when the writer posts the message; and means for discriminating whether a reply message can be inputted from the information of the message type of the reply target message and the attribute of the writer or not.

Further, the above object is accomplished by comprising: means for extracting information of a situation to make a conclusion and a timing of making the conclusion from an external work flow system, for examining the existing messages, for following the messages in cooperation with a mail system with respect to the message which a conclusion has to be made, and for controlling a timing to settle the discussion.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustration the preferred and alternate embodiments of the invention only, and not for the purposes of limiting the same, and wherein:

FIG. 1 is a block diagram for explaining a whole construction of an electronic conference system according to an embodiment of the invention;

FIG. 2 is a diagram for explaining an example of a message input screen;

FIGS. 3A to 3D are diagrams for explaining an example of a data structure of message data;

FIG. 4 is a diagram for explaining an example of a discussion tree and a message contents display;

FIG. 5 is a diagram for explaining an example of another message input screen;

FIG. 6 is a diagram for explaining an example of another message input screen in which message data is inputted;

FIG. 9 is a diagram for explaining an output example of a summary sentence summarized by an electronic conference summarizing system; and FIG. 10 is a block diagram showing another example of an electronic conference system according to another embodiment of the invention.

BRIEF DESCRIPTION OF THE PREFERRED EMBODIMENTS

Figure 7:
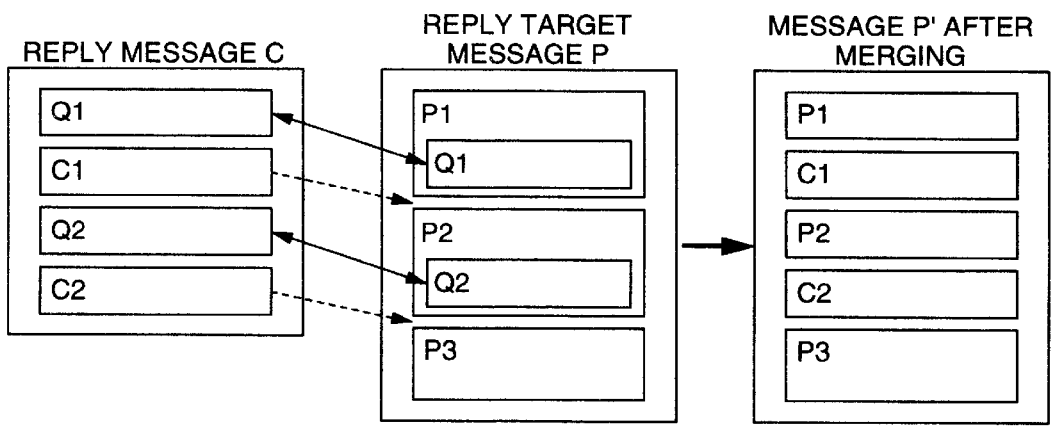
FIG. 7 is a diagram for explaining a merging method of message data.

An embodiment of an electronic conference system according to the invention will now be described in detail hereinbelow with reference to the drawings.

FIG. 1 is a block diagram for explaining a construction of the whole electronic conference system showing an embodiment of the invention.

In FIG. 1, an electronic conference system server 10 is connected to user clients 20 of the electronic conference system through a network 15. The electronic conference system server 10 is connected to a database 30 provided for an external storage device.

An electronic conference system 100 is provided in the electronic conference system server 10 and communicates with the user clients 20 through the network 15. The electronic conference system 100 is made up of: a message database 110; a message relation extracting unit 120; a message type setting unit 130; a message input and display unit 140; and a summarizing system 200 for an electronic conference.

The electronic conference summarizing system 200 is constructed by: a discussion path specifying unit 210; a message merging unit 220; a duplication message deleting unit 230; and a message summary file 240. The electronic conference summarizing system 200 communicates with the database 30.

The electronic conference system 100 allows the user as a conference participant to input a message from the user client 20 to the message input and display unit 140 and allows the message to be stored as message data into the message database 110. The message input and display unit 140 has a display function of the electronic conference system 100 and also has a function as input and output means for the user clients 20. By requesting or instructing to the message input and display unit 140, the user client 20 can freely refer to the messages of the other persons from the electronic conference system 100. The user client 20 can input a message which responds to the messages of the other persons as necessary.

In the message type setting unit 130, the kinds of message types and the number thereof are preliminarily defined. As message types, although an opinion, a question, an answer, a request, a report, a conclusion, and the like are disclosed in the embodiment, the message types of the invention are not limited to them. In response to the message from the user client 20, the message type setting unit 130 allows the message type to be displayed by the user client 20 through the message input and display unit 140 while keeping in contact with the message input and display unit 140 and sets the message type for the message.

The message relation extracting unit 120 discriminates the corresponding relation between the reply message and a reply target message, which will be explained hereinlater, while keeping in contact with the message input and display unit 140 and allows the corresponding relation to be held as a tree structure into the message database 110.

The discussion in the embodiment of the invention is equivalent to a series of message groups including messages responded to discuss with respect to a certain message or theme.

The discussion path specifying unit 210 in the electronic conference summarizing system 200 derives a process (hereinafter, referred to as a discussion path) from a message which poses a subject (hereinafter, called a proposed message) to a message indicative of a conclusion (hereinafter, called a conclusion message) among the message groups in which messages are constructed in a lump by a tree structure among the messages which are stored into the message database 110. When the discussion path is derived, the discussion path specifying unit 210 can use the database 30 of the external storage device. As a method of using the database, a use such that a keyword is traced in accordance with the reply relation of the messages stored in the database 30 or the contents of the messages or the like is considered. However, the invention is not limited to them.

When a discussion path is specified in the discussion path specifying unit 210, the message merging unit 220 merges the message data of the same subject as one message. In the duplication message deleting unit 230, the duplicated portion such as a quotation of the message or the like is deleted from the merged message.

Outputs of the message merging unit 220 and duplication message deleting unit 230 are stored as a message summary result into the message summary file 240 as necessary and can be also stored into the database 30.

FIG. 2 shows an example of a message input of the message inputted to the message input and display unit 140. The message input example is constructed by a message number 201, a title 202, a writer 203, a message type 204, and a text 205. The message number 201 is the number showing the order of messages. The title 202 is the name for a text which is posed by the writer. It is not always necessary that the message number 201 is serially added in one discussion. The writer 203 denotes the name of a person who spoke. The message type 204 is selected for the message by the user who inputs the message from a plurality of message types which have been preset in the message type setting unit 130. In the example of FIG. 2, "question" is selected as a message type. As for the text 205, an area to be used can be also selectively used in accordance with a degree of importance of the message contents. In this case, data indicating in which area in the text 205 the message is included becomes information when the discussion on the electronic conference system is summarized. In the example shown in the diagram, as shown in each column of importance 206, supplementary 207, and relation 208, fields for inputting the contents of the different levels are provided in the text 205. The message is inputted to a necessary portion by the user in accordance with the contents of the subject. As for the contents of the inputted message, a degree of importance is automatically set by the inputted field. The text shown as an example in FIG. 2 shows a state where the message contents have been inputted in each column of "importance" 206 and "supplementary" 207 and a state where the message contents are not inputted in the column of "relation" 208.

When the operation is finished for each of the above columns, the user client 20 instructs either one of "cancel" 209 and "register" 210 on the message input screen, thereby finishing the process. The message input and display unit 140 in which "register" 210 has been instructed stores the input data as message data into the message database 110.

FIGS. 3A to 3D are diagrams for explaining an example of a data structure of the message data. FIG. 3A shows the contents of a message record which is stored into the message database 110 as message data which is registered by an instruction of the user client 20. The message numbers are sequentially collected by the message input and display unit 140 in FIG. 1 in accordance with, for example, the inputting order of the messages. The message has a writer, a message type, a message title, a text, and the like inputted to the message input and display unit 140 as items. FIG. 3B shows an example of a node of a message relation list. The message relation list is formed as a node (message node) every message for each message. This node indicates a relation between the message corresponding to the node and the reply message. Each node has four elements. Those elements are called a first element, a second element, a third element, and a fourth element, respectively. In the first element of the message node, the message number of the node is stored. In the second element of the message node, the parent message number as a parent message of the node is stored. In the third element of the message node, the message number of the message node which was responded to the message is stored and is used as a pointer to the reply message list for the message. The fourth element of the message node is a pointer to the next reply message for the parent message.

A process to form a message relation list of a message when the message is newly posted (hereinafter, such a message is called a new message) will now be described.

When a new message is added for the first time, a new node is formed, the message number of the new message is inputted to the first element, and a space (Nil) is substituted into the remaining elements.

Subsequently, in the case where the new message is a reply to the message of the other person, the message number of the message of the other person which responds (hereinafter, such a message is referred to as a parent message) is substituted into the second element of the message node. At this time, simultaneously, the message number of the new message is substituted into the third element of the node of the parent message.

In the case where the added new message is a reply to the message of the other person and the third party has already posted the reply message for the message of the other person, the message number of the parent message (message of the other person) is substituted into the second element of the node of the new message. The message number of the new message is substituted into the fourth element of the node (message node of the reply message of the third party) which is linked from the third element of the node of the parent message. In this case, when the fourth element of the node of the link destination from the parent message has not been Nil, the link of the fourth element is traced until the fourth element reaches the Nil node. The message number of the new message is substituted into the fourth element of the final node of the link.

A situation of making the node mentioned above will now be described with reference to FIG. 3C as follows.

When the first writer posts a message, a node a is formed. A fact that the message is the first message is posted as "0001" into the first element of the node a. In this instance, "Nil" is substituted into all of the other elements.

When the reply message for the first message is posted as a second message, a node shown in node b is formed. When the node b is formed, "0002" is registered into the first element of the node b. Since the parent message is the first message, "0001" is registered into the second element and "Nil" is substituted into the other elements. In this instance, "0002" is registered into the third element of the node a as a first message node.

When the reply message for the first message is posted as a third message from the other user, a node c is formed. As for the node c, "0003" is registered into the first element, "0001" is registered into the second element, and "Nil" is substituted into the other elements. In this instance, since a fact that the reply from the other person had already been performed has been registered in the third element of the node a corresponding to the parent message, "0003" is registered into the fourth element of the node b corresponding to the message posted here.

A case where a reply message for the second message is posted as a fourth message will now be described. In this case, a node d in which "0004" is registered into the first element, "0002" is registered into the second element, and "Nil" is substituted into the other elements is formed. Since the fourth message is the reply message for the second message, "0004" is registered into the third element of the node b corresponding to the second message.

A case where a reply message for the third message is posted as a fifth message will now be described. In this case, a node e in which "0005" is registered into the first element, "0003" is registered into the second element, and "Nil" is substituted into the other elements is formed. Since the fifth message is the reply message for the third message, "0005" is registered into the third element of the node c corresponding to the third message.

A case where a reply message for the fourth message is posted as a sixth message will now be described. In this case, a node f in which "0006" is registered into the first element, "0004" is registered into the second element, and "Nil" is substituted into the other elements is formed. Since the sixth message is the reply message for the fourth message, "0006" is registered into the third element of the node d corresponding to the fourth message.

In a manner similar to the above, each time a new message is posted, a new node is formed and a link is coupled between the new node and the nodes corresponding to the messages so far.

FIG. 3D specifically shows a tree of the discussion of the conference described above. It is arranged such that for the message of the message number 0001 instructed as a question for the first time, a plurality of answers, requests, or the like are collected as reply messages and, finally, the writer "Takahashi" posted a message as a conclusion. "Re" in the title is a headline showing an answer, request, or the like. A duplication of Re indicates an answer or a request to the answer or an answer for a request or the like to the answer.

An example displaying a discussion tree shown in FIG. 3D and the contents of one message is shown in FIG. 4. In the example shown in the diagram, a message situation up to the fifth message is shown as a tree and an example in which a text of the first message is simultaneously displayed is shown. This display screen can be displayed for the electronic conference system by using the user client 20 in response to a request of the participant of the conference. When an arbitrary message is selected from the discussion tree on the display screen, the text of the selected message is displayed. In the display example of FIG. 4, when a button of "Reply" is selected by using the display screen in a state where the message has been selected, an input screen for the selected message in the tree is displayed and a reply can be performed.

Although not shown, in the initial state of starting a conference, a state where nothing is displayed in the discussion tree shown in FIG. 4 can be also displayed. In this case, for example, a button of "New" (not shown) is displayed. By selecting the "New" button, a problem such as a question or the like can be posed and a conference can be opened. In the example shown in FIG. 2, the first message example in which the conference was opened is shown and the proposed title is set to a problem proposal.

FIG. 5 shows a display example of a message screen to input a new message by pressing the reply button after the proposed message "0001" was selected in FIG. 4. The message number "0002" is allocated to the message. In the text of the parent message, a quotation symbol ">" is added to the head of the row.

FIG. 6 is a diagram for explaining a message (message number "0004") posted in response to the contents of the message in FIG. 5. A row to which a quotation symbol ">>" is allocated in the "Importance" column of the text in FIG. 6 shows that the text of the message number "0002" citing the text of the proposed message (message number "0001") is further cited by the message number "0004". In the "Importance" column of the text in FIG. 6, a row to which the quotation symbol ">" is allocated denotes that the sentence inputted by the message number "0002" as a parent message of the message number "00041" is cited. In FIG. 6, a state where the message is inputted after the sentence to which the quotation symbol was added is shown. When a posting process is performed by pressing a posting button in this state, the message of the message number "0004" is stored into the message database 110.

A merging method of the message data will now be described with reference to FIG. 7 and its processing operation will now be described with reference to a flow shown in FIG. 8.

As shown in FIG. 7, the relation between a reply message C and a reply target message P will now be described as two certain messages. The sentence of the reply message C can be divided into a quotation portion Q={Q1, Q2, . . . , Qn} and a message portion C={C1, C2, . . . , Cm} by the quotation symbol. The quotation symbol may be generally ">" which is used at the head of each row or may be also another symbol. It is sufficient to use a symbol as long as it is a symbol which can distinguish a sentence which is newly inputted as a reply message and a sentence to be cited and can be electronically discriminated.

When the reply message C is inputted, it is assumed that a reply is performed by adding a message to either one of the upper and lower portions of the corresponding quotation sentence as a prerequisite. By adding a new message to either one of the upper and lower portions of the quotation sentence, a correspondence between the quotation portion Q and the message portion C is clarified. The elements of the quotation portion Q are sequentially extracted from the reply message C posed on the basis of such a rule. The sentence in the reply target message P is examined and the coincident portions are searched. The quotation portion Q and the corresponding message portion C are inserted just after the search result in the reply target message P and are merged. After that, a message P' is formed. After completion of the processes of the whole document of the reply message C, it is assumed that the merging of the reply message C and reply target message P has been finished.

A merging process which is executed in the electronic conference summarizing system 200 will now be described by using a flowchart of FIG. 6.

(1) First, the conclusion message is searched from the messages stored in the message database 110 and is stored as a message A. A check is made to see if the message A is a proposed message instead of the reply message of the other message. If the message A is the proposed message, the process is finished (steps 61, 62).

(2) When it is decided in step 62 that the message A is not the proposed message, the reply target message of the message A is searched and this message is stored as a message B. The next quotation portion of the message A, in this case, since it is the first time, Q1 is stored as QB, and the message portion of the message A, in this case, since it is the first time, C1 is stored as CB (steps 63, 64).

(3) It is confirmed that there is a message portion as CB (CB is not nil), the quotation portion stored as QB is searched from the message B as a reply target message and CB is inserted just after QB of the message B serving as a reply target message of the message A (steps 65 to 67).

(4) A check is made to see if QB or CB is the end of A. When it is not the end, the processes from step 64 are repetitively executed, thereby merging all of the quotation portions and message portions of the message A and storing the reply message A as A (steps 68, 69).

(5) After that, the processes from step 62 are repeated. When it is determined that A is the proposed message, namely, when the merging of each message is finished while sequentially tracing from the conclusion message to the proposed message, the message finally merged is outputted as a summary document. The processes are finished.

An output example of the summary sentence summarized by the electronic conference summarizing system by the foregoing processes is shown in FIG. 9. The summary sentence according to the output example is formed by the following procedure when a display request of the summary is issued from the user client to the electronic conference system. First, when the message whose attribute is "result" or the message of the "result" attribute is not found out from the discussion tree made in FIG. 4, the electronic conference system searches the deepest message, namely, the message of the longest branch in the discussion tree. Subsequently, the electronic conference system sequentially traces the parent message numbers on the basis of a search result, specifies and forms the typical path of the discussion. In the discussion path, the first message and the conclusion message are arranged on the basis of the processes described in FIG. 8, thereby displaying in an interactive form as shown in FIG. 9. In this instance, what is displayed is a message inputted as "importance" at the time of posting a message. By designating a button of "details", the discussion between the designated discussion paths, namely, the messages posted for a period of time from the proposed message to the conclusion message can be also displayed in a state where the quotation relation is held.

The embodiment of the invention has been described on the assumption that a summary of the discussion of the whole conference is formed by merging each message while sequentially tracing from the message in which the message attribute in the electronic conference is "result" to the proposed message, for example, the first "question" message. However, even in the halfway of the discussion, the deepest message is searched, each message is merged while sequentially tracing from here to the proposed message, and the proceeding of the discussion is summarized, thereby enabling the user who participates in the electronic conference halfway to promptly understand the proceeding of the discussion until now.

According to the embodiment of the invention mentioned above, with respect to discussion serving as a core in the discussion, the portions where the contents are duplicated due to the quotation are eliminated, exchanges of the discussion are made correspond, and the formation or reference of a sentence to efficiently read the contents of the discussion can be supported. Therefore, when a logical path is determined, for example, by designating a necessary logical path in a state where the discussion tree is displayed and executing the foregoing processes in the electronic conference summarizing system, a summary of the discussion can be easily obtained.

FIG. 10 is a block diagram showing another example of an electronic conference system according to another embodiment of the invention. According to another embodiment in the invention which will be explained by using FIG. 10, a function to support the proceeding of a discussion in an electronic conference is added.

In FIG. 10, an electronic mail system 40 and a work flow system 50 are connected to the electronic conference system server 10 provided with the electronic conference system 100. The electronic conference system 100 comprises a message collating unit 250, a message checking unit 260, and a message checking and following unit 270. It will be obviously understood that the embodiment which will be described in FIG. 10 can be used by adding to the electronic conference system shown in FIG. 1. The other reference numerals designated in the other construction in FIG. 8 are the same as those in case of FIG. 1.

In FIG. 10, a case where a posting of the reply message is requested from the user client 20 will now be described. The message collating unit 250 extracts a message from the message database 110, examines the attributes of the message, and searches and examines the attributes of the writer which have previously been registered from the external database 30.

The message checking unit 260 discriminates the permission or inhibition of a message from the attribute information of the reply target message and reply message and the attributes of the writer. If it is determined that the message can be performed, the message is accepted and posted. In this instance, the knowledge about the proceeding of the message can be obtained from the external database 30. Thus, a situation such that the person in a position where he cannot make a conclusion decides a conclusion and the discussion is carelessly confused can be prevented.

When the proposed message is posted in the message input and display unit 140 in FIG. 1, so long as the person in a position where he should make a conclusion and its timing are registered in accordance with the message, the message checking and following unit 270 periodically confirms the posted message and date of validity of the relevant person to the message database 110. When the relevant message is not performed until the date of validity, the message checking and following unit 270 instructs the electronic mail system 40 so as to transmit a mail for promoting the registered relevant person to post a message. In the case where a writer in which the conclusion of the subject is required or a reply person of the message is designated, it is controlled so that the messages are sequentially posted in accordance with a specific order by the external work flow system 50. In this case, for example, such a control can be realized by flow processing the message input screen by requesting the message to the designated writer by a mail or by activating the work flow.

According to the embodiment of the invention, the electronic conference can be smoothly proceeded without confusing the discussion.

Figure 8:
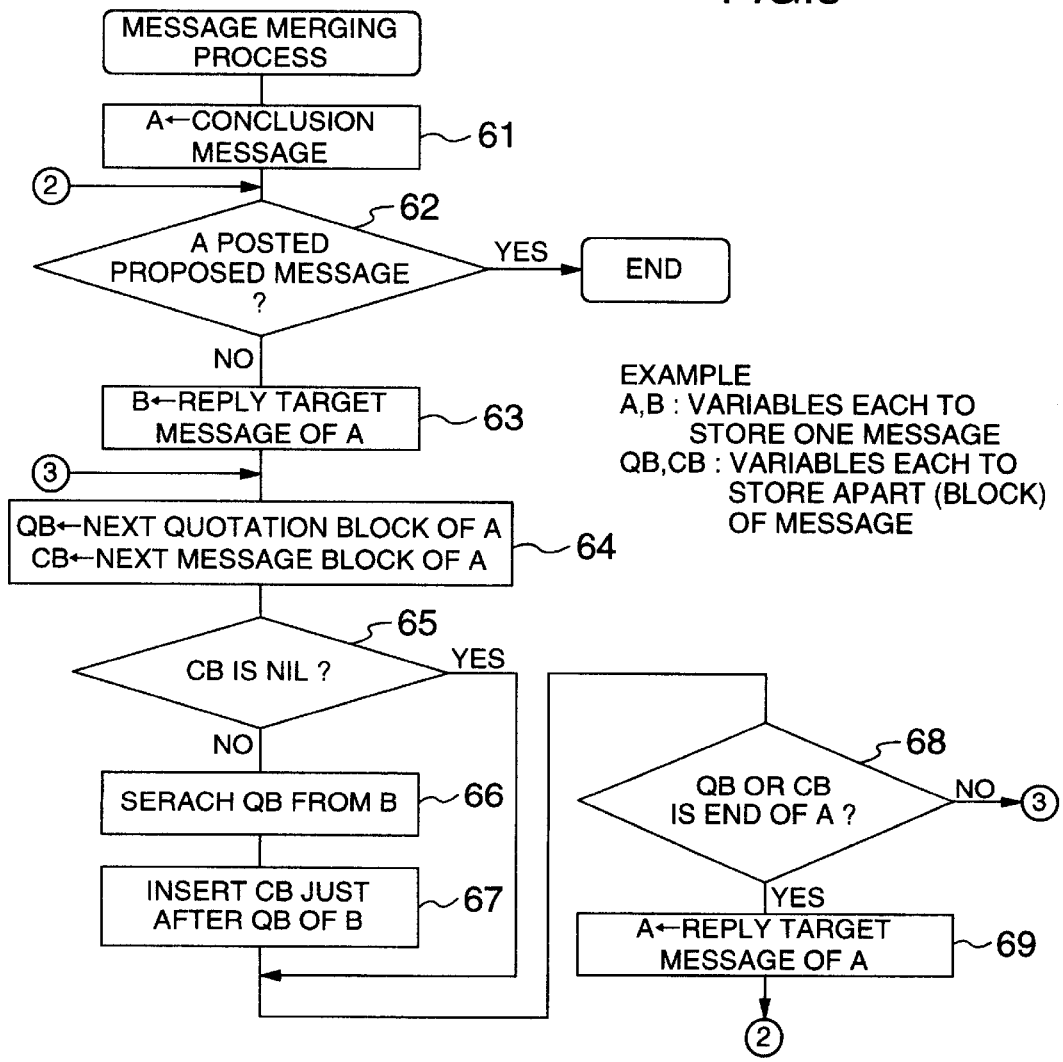
FIG. 8 is a flowchart for explaining a process to merge the message data.

In the embodiment of the invention mentioned above, the message relation extracting unit 120, message type setting unit 130, discussion path specifying unit 210, message merging unit 220, and duplication message deleting unit 230 shown in FIG. 1, and the message collating unit 250, message checking unit 260, and message checking and following unit 270 shown in FIG. 8 can be constructed as programs by software. It will be obviously understood that those programs are stored into a storage medium such as floppy disk, CD-ROM, DVD-ROM, or the like and are stored into a storage device of a computer so that the computer can operate.

According to the invention as described above, when the participant wants to refer to the proceeding of the discussion in the halfway or after the end of the discussion, only the important portions in all of the messages are extracted and can be allowed to be referred to the user. The time of a discussion which uses an electronic conference system can be reduced and the conference can be smoothly proceeded.

What is claimed is:

1. An electronic message system in which a plurality of users can post messages and the user can refer to the posted messages, comprising:

a client for transmitting a message including at least a text of the message; and a server for receiving the message transmitted from said client through a network, wherein said server comprises a database for posting a message, related information holding means for holding information for related subject between the message posted in said database and other posted message, and summary forming means for, in a case where the message transmitted from said client is a message according to the message posted in said database, registering a quotation sentence which cites said posted message into said database together with said message thus transmitted and for forming a summary by merging a series of related messages on a basis of said information for related subject.

2. A system according to claim 1, wherein when a plurality of messages are merged on the basis of said information for related subject, said summary forming means merges said plurality of messages while leaving at least one quotation sentence except for duplicated quotation sentences.

3. A system according to claim 1, wherein when the message is posted, said server posts it into said database together with a predefined message type, and said summary forming means specifies the series of messages by using said message type.

4. A system according to claim 1, wherein when the message is posted, said server adds an identification code to the quotation sentence which cites said posted message and posts the message into said database.

5. A system according to claim 4, wherein when a plurality of messages are merged on the basis of said information for related subject, said summary forming means discriminates duplicated quotation sentences from said identification code and merges said plurality of messages while leaving at least one quotation sentence.

6. A system according to claim 1, wherein when the message transmitted from said client is posted into said database, said server posts the message into a message list and stores information for related subject with the other messages into said message list.

7. A system according to claim 6, wherein said client has display means and said display means displays a message tree based on said message list and displays the messages which is posted in said database and displayed in said message tree for said server by an instruction from the user.

8. A system according to claim 4, wherein when the message transmitted from said client is posted into said database, said server posts the message into a message list and stores information for related subject with the other messages into said message list, and wherein said client has display means, said display means displays a message tree based on said message list, and when responding to the message displayed in said message tree by an instruction from the user, said display means adds said identification code to said quotation sentence from the message posted in said database and displays.

9. A system according to claim 1, wherein said summary forming means forms a summary by merging the first message and the last message of said series of messages.

10. An electronic message system in which a plurality of users can post messages and the user refers to the posted messages, comprising:

a client for transmitting a message or a request from the user; and a server for processing the message or request transmitted from said client through a network, wherein said server comprises a database which registers a plurality of kinds of message types which have previously been defined, a message inputted to said client, and a posted message in a case where said message is a message according to said posted message, and summary forming means which merges a plurality of specified related messages on a basis of information for related subject of said message types and each of the posted messages and which forms a summary by leaving at least one duplicated message among duplicated portions where the messages continue among the series of merged messages and by deleting others.

11. A system according to claim 10, wherein said server discriminates a conclusion message of a discussion by said message type and specifies a series of messages concerning a message which poses the discussion from said conclusion message by using said information for related subject.

12. A system according to claim 10, wherein when the message is posted, said server adds an identification code to a quotation sentence which cites said posted message, posts the message into said database, and specifies a duplicated portion of the message from said series of messages by using said identification code.

13. A system according to claim 10, wherein when the message transmitted from said client is posted into said database, said server posts the message into a message list and stores information for related subject with the other messages into said message list.

14. A system according to claim 13, wherein said client has display means, and said display means displays a message tree based on said message list and displays the messages posted in said database displayed in said message tree for said server by an instruction from the user.

15. A system according to claim 12, wherein when the message transmitted from said client is posted into said database, said server posts the message into a message list and stores information for related subject with the other messages into said message list, and wherein said client has display means, said display means displays a message tree based on said message list, and when responding to the message displayed in said message tree by an instruction from the user, said display means adds said identification code to said quotation sentence from the message posted in said database and displays.

16. A system according to claim 10, wherein said summary forming means forms a summary by merging the first message and last message among said series of messages.

17. A system according to claim 10, wherein said server further comprises:

knowledge base constructing means for registering said summary into said database; and similar item extracting means for extracting similar items from said database on the basis of the message inputted from the user and presents.

18. A system according to claim 10, wherein said server further comprises:

attribute accumulating means for accumulating an attribute of a writer into said database;

attribute allocating means for automatically allocating the attribute accumulated in said attribute accumulating means to the message when the writer posts the message; and attribute discriminating means for discriminating whether a message which responds to said posted message can be posted or not from said message type of the posted message serving as a target of a reply and the attribute of the writer.

19. A system according to claim 10, wherein said server further comprises:

mail associating means in which a writer who poses a corresponding message for a specific message and a term of validity are registered and which allows a mail system connected to said server to notify of a mail to follow the message unless said corresponding message is presented.

* * * * *